(12) United States Patent  
Nagayama et al.

(10) Patent No.: US 7,543,021 B2  
(45) Date of Patent: Jun. 2, 2009

(54) NETWORK CONFERENCE SYSTEM

(75) Inventors: Hironori Nagayama, Tokyo (JP); Soichi Tanigaki, Tokyo (JP); Izumi Ota, Tokyo (JP); Mitsuyoshi Amano, Tokyo (JP); Keiji Suginohara, Tokyo (JP)

(73) Assignee: Pioneer Corporation, Tokyo (JP)

( * ) Notice: Subject to any disclaimer, the term of this patent is extended or adjusted under 35 U.S.C. 154(b) by 791 days.

(21) Appl. No.: 11/065,298

(22) Filed: Feb. 25, 2005

(65) Prior Publication Data

US 2005/0198123 A1  Sep. 8, 2005

(30) Foreign Application Priority Data

Feb. 25, 2004  (JP)  ............................. P2004-050552

(51) Int. Cl.  
*G06F 15/16* (2006.01)

(52) U.S. Cl. ........................ 709/204; 709/203; 709/206; 709/207

(58) Field of Classification Search .......... 709/203–209  
See application file for complete search history.

(56) References Cited

U.S. PATENT DOCUMENTS

| | | | |
|---|---|---|---|
| 5,668,863 A | | 9/1997 | Bieselin et al. |
| 5,978,835 A | * | 11/1999 | Ludwig et al. ............... 709/204 |
| 6,775,358 B1 | * | 8/2004 | Breitenbach et al. ...... 379/88.13 |
| 6,972,786 B1 | * | 12/2005 | Ludwig .................... 348/14.11 |
| 7,089,319 B2 | * | 8/2006 | Lysenko et al. ............. 709/231 |
| 7,328,239 B1 | * | 2/2008 | Berberian et al. ........... 709/204 |
| 7,349,944 B2 | * | 3/2008 | Vernon et al. ............... 709/204 |
| 2004/0153504 A1 | * | 8/2004 | Hutchinson et al. ......... 709/204 |
| 2005/0034079 A1 | * | 2/2005 | Gunasekar et al. .......... 715/753 |
| 2005/0180341 A1 | * | 8/2005 | Nelson et al. ............... 370/260 |

FOREIGN PATENT DOCUMENTS

JP        7-182365 A        7/1995

OTHER PUBLICATIONS

Chinese Office Action dated Dec. 29, 2006, in Application No. 200510052115.6.

* cited by examiner

*Primary Examiner*—Patrice Winder  
*Assistant Examiner*—Thomas Duong  
(74) *Attorney, Agent, or Firm*—Sughrue Mion, PLLC

(57) ABSTRACT

It is assumed that a presenter A makes an important statement at a scene 2 in a real-time conference. Participants B and C press a chapter insertion button at times t4 and t5 respectively (steps S1-1 and S1-2). A conference server turns back the time by a predetermined time from the times t4 and t5 (steps S2-1 and S2-2) and sets headings (manual insertion chapters) HCP2 and HCP3 at the turned-back times (t2 and t3). Alternatively, the conference server determines the time separator just before the time (namely, CP4) and sets a heading HCP1 at the time (S4). Accordingly, the heading is set before the scene 2 where the presenter A makes an important statement.

7 Claims, 10 Drawing Sheets

NETWORK CONFERENCE SYSTEM

The present disclosure relates to the subject matter contained in Japanese Patent Application No. 2004-050552 filed on Feb. 25, 2004, which is incorporated herein by reference in its entirety.

BACKGROUND OF THE INVENTION

1. Field of the Invention

This invention relates to a network conference system, a conference terminal, and a conference server.

2. Description of the Related Art

In an electronic conference system, the description of an electronic conference (multimedia data) is saved (stored), whereby it is made possible to later reproduce the conference description.

However, it is inefficient to check all of the saved conference data. Then, as a related art, minutes provided by editing the description of an electronic conference are created and when the minutes are created, a minute creation support apparatus is used (See JP-A-7-182365).

SUMMARY OF THE INVENTION

In the related art described above, although support of the minute creation support apparatus is provided, considerably heavy work and much time are taken for creating the minutes provided by editing the description of an electronic conference.

To enhance the accuracy of the minutes, after all, it becomes necessary to review all past conference descriptions.

That is, even if all conference descriptions (multimedia data) are saved, much labor and time will be taken to later make the effective use of the saved conference data.

It is one of objects of the invention to make it possible to efficiently use saved conference data without creating minutes for improving the ease-of-use of a network conference system.

According to one aspect of the invention, there is provided a server-client network conference system including: a conference server having a real-time conference data file containing real-time conference data placed on time series and an index file used to search the real-time conference data file and having time-of-day information, heading information, and information to access the real-time conference data file as they are associated with each other; and a conference terminal as a client connected to the conference server through a network, wherein, after a real-time conference is over, the real-time conference data file is accessed based on the heading information in the index file and any desired real-time conference data can be read and played back on the conference terminal, wherein the conference terminal includes a manual input unit for a user to manually enter a heading insertion request, and wherein the conference server, when a participant of the real-time conference enters the heading insertion request through the manual input unit of the conference terminal while the real-time conference proceeds, determines the time turned back from the point in time at which the heading insertion request is entered, sets a manually inserted heading at the determined point in time, and records information of the setup heading in the index file.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of the invention.

First Embodiment

Figure 1:
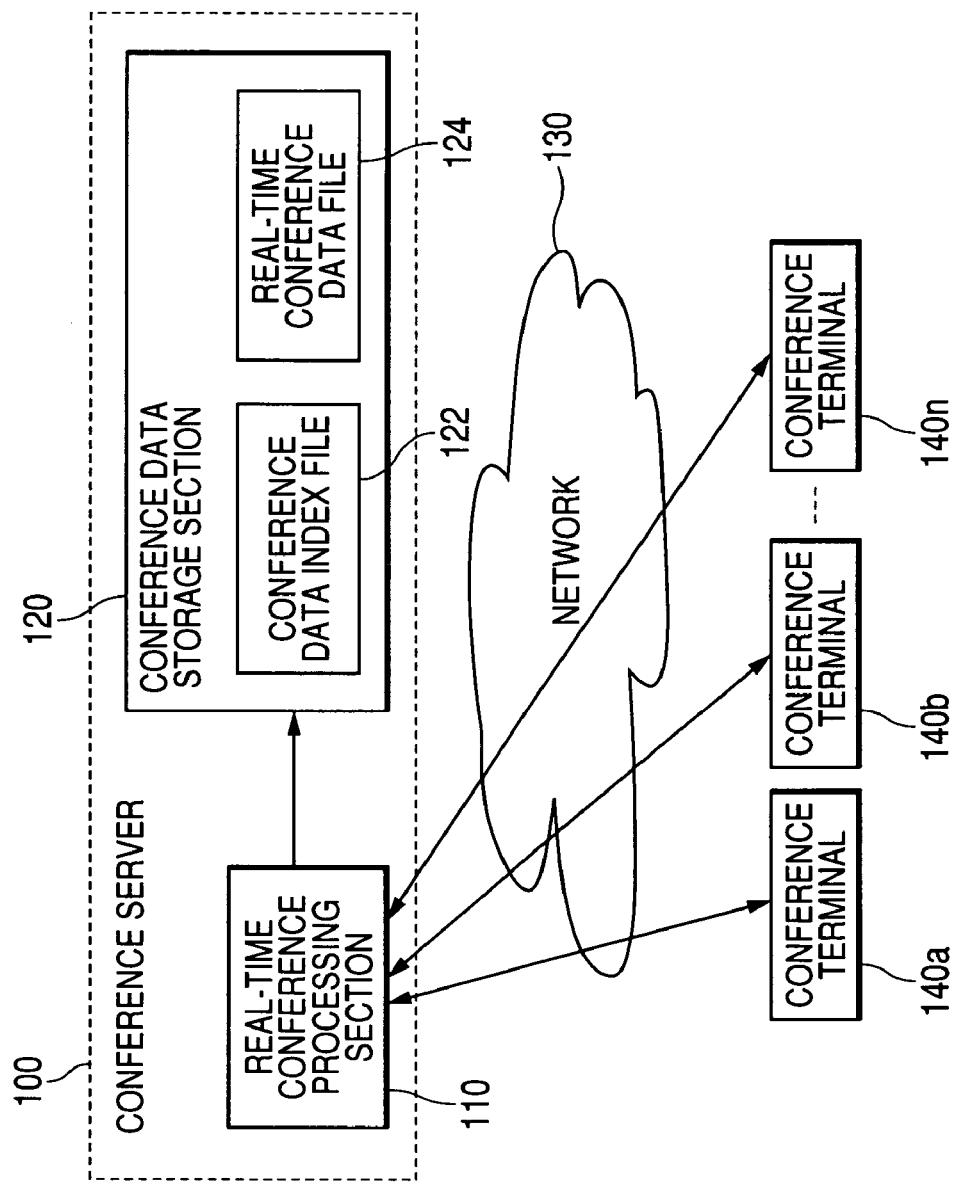
FIG. 1 is a block diagram to describe the characteristic configuration of a network conference system according to a first embodiment of the invention and an outline of execution of a real-time conference and the record operation of real-time conference data.
Figure 2:
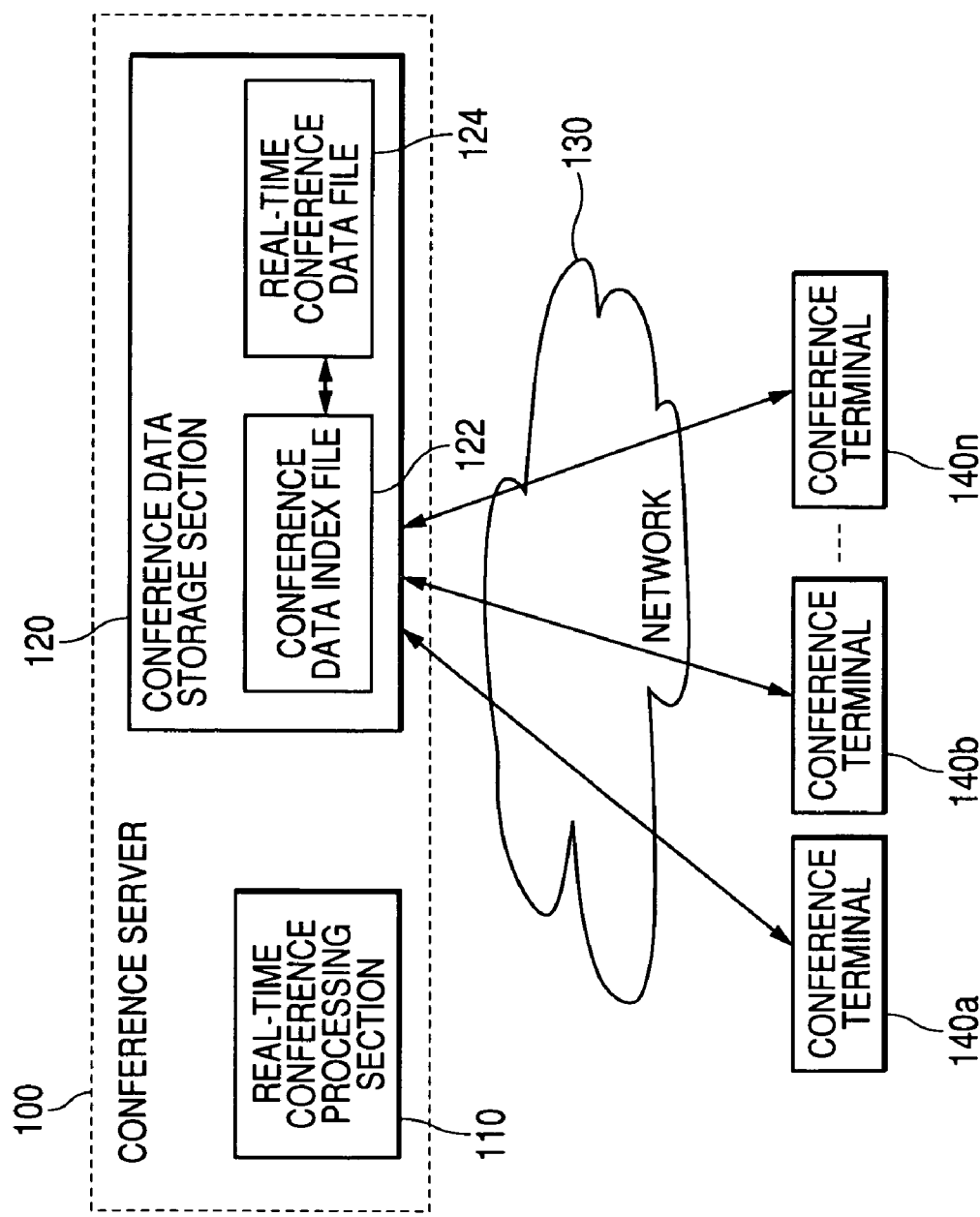
FIG. 2 is a drawing to describe an outline of the operation at the playback time of real-time conference data.

FIG. 1 is a block diagram to describe the characteristic configuration of a network conference system according to a first embodiment of the invention and an outline of execution of a real-time conference and the record operation of real-time conference data. FIG. 2 is a drawing to describe an outline of operation at the playback time of real-time conference data.

As shown in FIG. 1, the network conference system according to the embodiment of the invention is a server-client system having a plurality of conference terminals 140a to 140n connected to a conference server 100 through a network 130.

The conference server 100 has a real-time conference processing section 110 for performing centralized processing of multimedia data occurring in a real-time conference and a conference data storage section 120 for storing real-time conference data (multimedia data) at any time.

The conference data storage section 120 saves multimedia data as a predetermined format file (real-time conference data file 124).

The conference data storage section 120 also creates a conference data index file 122 to make it possible to efficiently access the real-time conference data file 124.

The conference data index file 122 contains heading (chapter) information and access information (reference destination address information) to the real-time conference data file 124 in addition to time-of-day information (time stamp).

The conference participants make a conference reservation at the conference server 100 and when the conference start time is reached, they access the conference server 100 from the conference terminals 140a to 140n to take part in the conference and transmit and receive conference data to and from the real-time conference processing section 110.

The real-time conference data (multimedia data) is stored in the conference data storage section 120 at any time. That is, the real-time conference data file 124 and the conference data index file 122 are created and saved concurrently with the progress of the conference.

At the playback time of the real-time conference data, as shown in FIG. 2, each of the conference terminals 140a to 140n accesses the conference data storage section 120 and references the conference data index file 122.

That is, a heading list recorded in the conference data index file 122 is referenced and any desired heading is specified.

Then, the real-time conference data file 124 on and after the point in time at which the heading was set is read and is sent to the conference terminals 140a to 140n, and the conference data is played back on each conference terminal.

The heading list created based on the conference data index file 122 is referenced, whereby the users of the conference terminals can immediately know the number of important parts (important scenes) of the conference, the time at which each scene occurred (or the elapsed time since the conference start), etc.

Therefore, the heading list substantially serves as minutes. Since the conference data index file 122 is automatically created during the conference, saving in the time and labor for creating minutes after the conference can be accomplished.

As the conference data index file 122 is referenced, the real-time conference data file 124 can be accessed efficiently and any desired part of the conference data can be played back. Therefore, the effective use of the saved real-time conference data file can be made.

Figure 3:
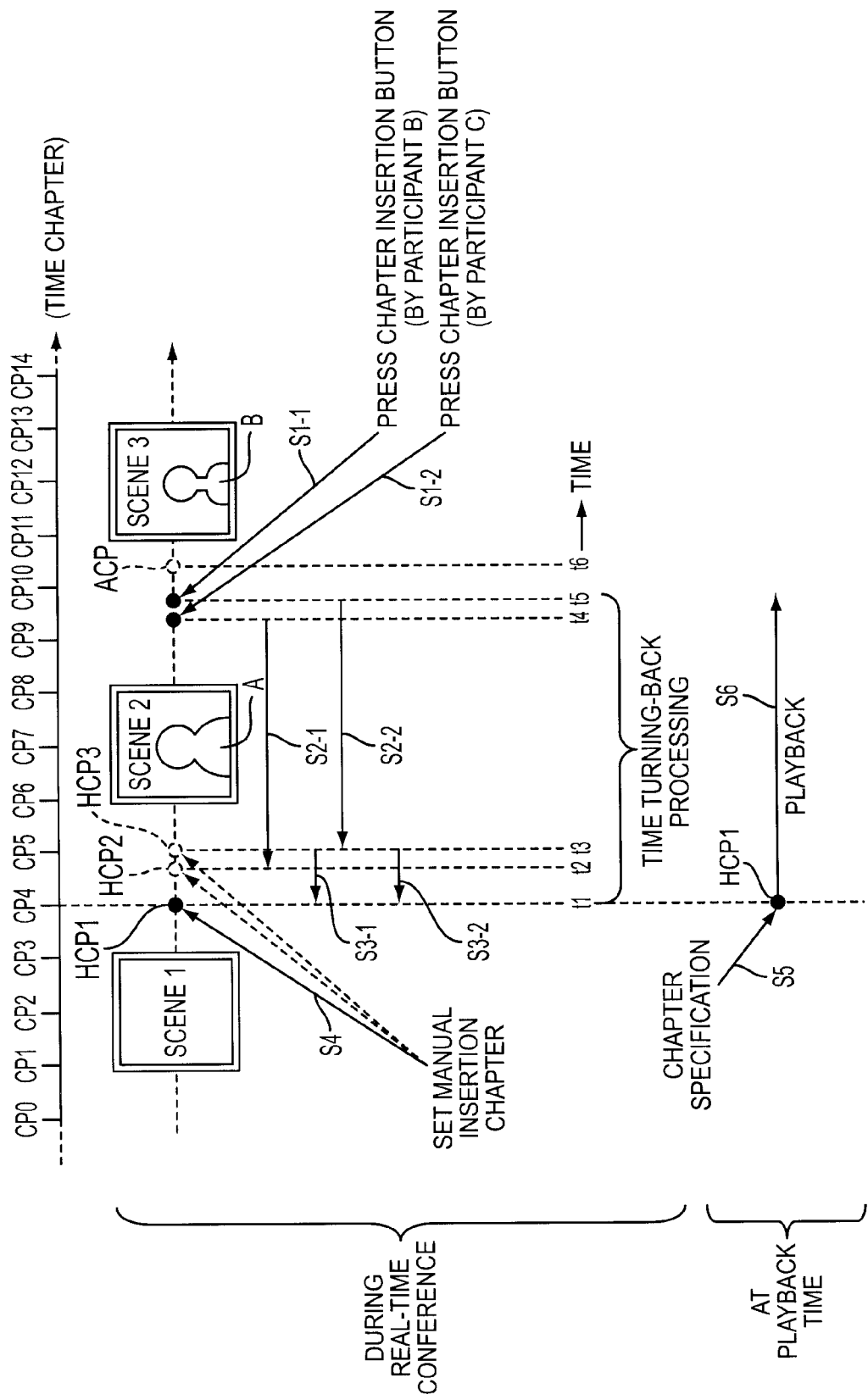
FIG. 3 is a drawing to describe the characteristic operation in the network conference system of the first embodiment of the invention (specific operation concerning heading setting)

FIG. 3 is a drawing to describe the characteristic operation in the network conference system of the embodiment (specific operation concerning heading setting by manual insertion). CP0 to CP14 shown on the top of FIG. 3 are time separators (time chapters) provided at predetermined time intervals on the time axis.

The time separators (time chapters) are used as the reference when a manually inserted heading (manual insertion chapter or heading by manual insertion) is set.

The operation during the real-time conference is shown in the upper portion of FIG. 3.

As shown in the figure, the screen is switched from scene 1 to scene 2 to scene 3. Here, the presenter is A at the scene 2 and is changed to B at the scene 3.

The fact that the presenter is changed and that the page of the referenced document is changed needs to be recorded automatically. Therefore, an automatic insertion chapter (heading by automatic insertion) ACP indicating the presenter change is set at time t6.

Assume that the presenter A makes an important statement at the scene 2. To set a heading (manual insertion chapter) in the important scene 2, participants B and C press chapter insertion buttons provided on their respective conference terminals (see FIG. 6) at times t4 and t5 (steps S1-1 and S1-2).

However, when the chapter insertion buttons are pressed, the important scene 2 already becomes the past.

Then, the conference server turns back the time by a predetermined time (for example, 30 seconds) from the times t4 and t5 (steps S2-1 and S2-2) and determines the turned-back times (t2 and t3).

If headings (manual insertion chapters) HCP2 and HCP3 are set at the turned-back times (t2 and t3) on the time axis, it is made possible to set a heading before the scene 2 at which the presenter A makes an important statement.

However, it is cumbersome to enable a heading to be set at any desired time on processing of hardware (the hardware burden is heavy).

If a large number of participants issue a heading insertion request all at once at slightly different timings, headings by manual insertion (manual insertion chapters) as many as the number of the heading insertion requests are set and the burden is also heavy from this point; it is also inefficient.

Therefore, preferably, time separators (time chapters) CP0 to CP14 are previously provided on the time axis at predetermined time intervals and when a heading insertion request occurs, the time is turned back by a predetermined time (for example, 30 seconds) and a heading is set in the part (time) of the time separator (time chapter) just before the turned-back time.

That is, in FIG. 3, the time is further turned back from the time determined by turning back the time the predetermined time (time t2, t3) (step S3-1, S3-2) and heading by manual insertion (manual insertion chapter) is set at the time (time t1) of the time separator (time chapter) CP4 (step S4).

Accordingly, if a plurality of participants make a heading insertion request, the headings can be put together at one point in time (time).

Since it is determined on the system that a time separator (time chapter) is inserted at predetermined time intervals, the time separator (time chapter) is used as the heading setting reference, whereby the hardware burden in setting the heading is also lessened.

The setup heading by manual insertion (manual insertion chapter) HCP1 (HCP2, HCP3), the automatic insertion chapter (chapter automatically inserted to record a change such as a presenter change and a page change) ACP, and the time separators (time chapters) CP0 to CP14 are recorded in the reference data index file 122 in the conference server 100 (see FIG. 1).

The operation at the playback time of real-time conference data is shown in the lower portion of FIG. 3.

A heading list (containing time-of-day information with headings) is presented for the user who plays back the real-time conference data through the conference terminal 140a to 140n (see FIG. 2).

The heading list is created based on chapter information except time separator (time chapter) information (namely, "heading by manual insertion" information and "heading by automatic insertion" information). The heading list substantially functions as minutes.

If the user specifies a specific heading (manual insertion chapter) (step S5), the real-time conference data file 124 (see FIG. 2) on and after the time t1 corresponding to the heading HCP1 specified by the user is read by the conference server 100 (see FIG. 2).

The read real-time conference data file is sent to the conference terminal and is played back on the conference terminal (step S6).

Thus, if one participant holds a feeling that one scene is important during the real-time conference, the participant sends a manual insertion request of heading from his or her conference terminal to the conference server, whereby the heading by manual insertion (manual insertion chapter) can be set at the appropriate point in time (namely, the time before the scene occurs).

After the conference is over, the user of the conference terminal references the heading list and specifies a specific heading (manual insertion chapter or automatic insertion chapter), whereby the corresponding real-time conference data file can be played back.

Figure 4:
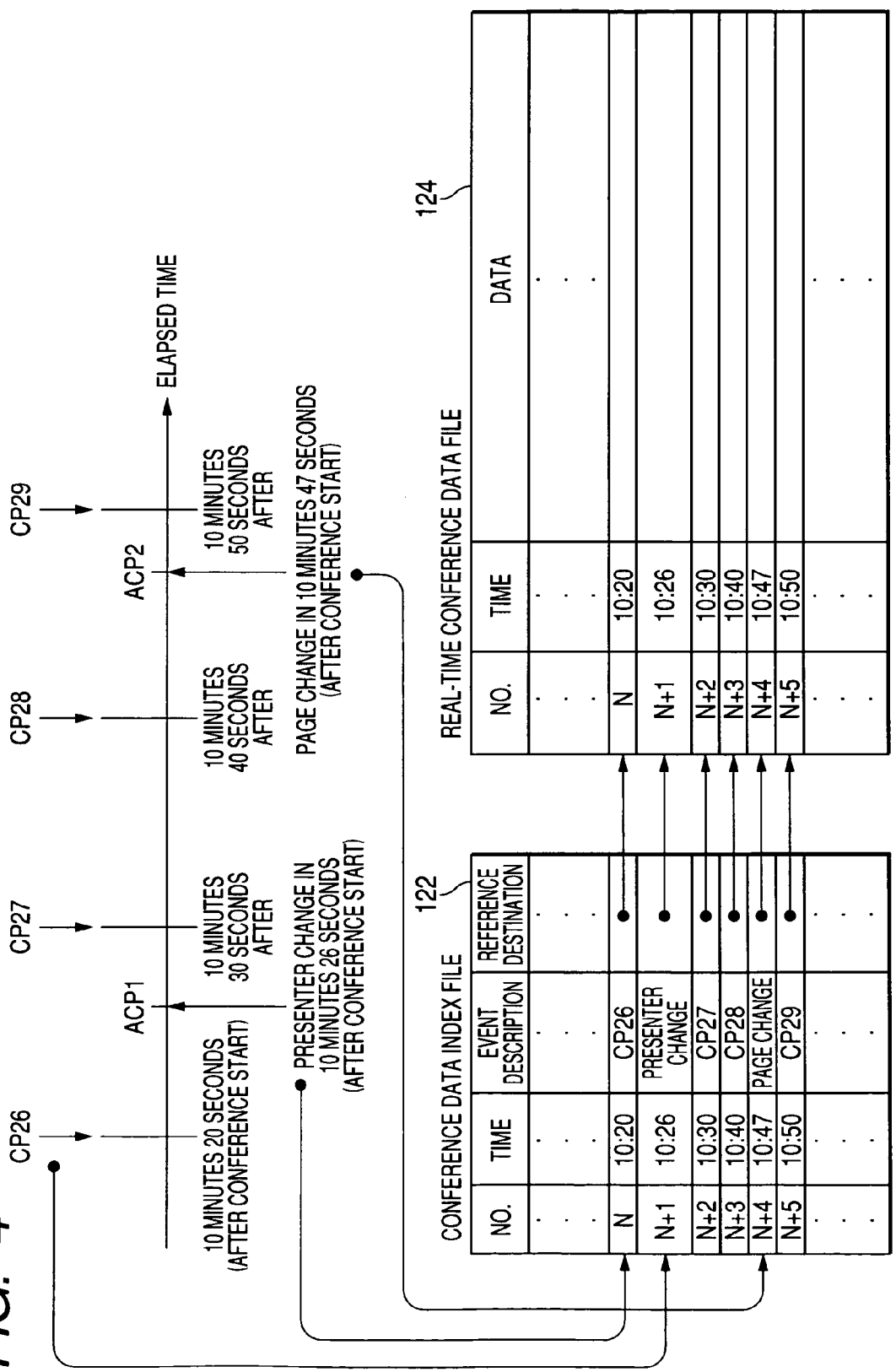
FIG. 4 is a drawing to describe the operation of recording time separators (time chapters) and automatic insertion chapters (headings automatically inserted to record change such as presenter change and page change) in the index file and the correspondence between the index file and the real-time conference data file.

FIG. 4 is a drawing to describe the operation of recording time separators (time chapters) and automatic insertion chapters (chapters automatically inserted to record a change such as a presenter change and a page change) in the index file and the correspondence between the index file and the real-time conference data file.

Time separators (time chapters) CP26 to CP29 are set at 10-second intervals as shown in the upper portion of FIG. 4.

CP26 is set in 10 minutes 20 seconds after the conference start and CP27 to CP29 are set at 10-second intervals as shown in the figure.

Automatic insertion chapter ACP1 is set to record a presenter change at the point in time when the time 10 minutes 26 seconds has elapsed since the conference start.

Automatic insertion chapter ACP2 is set to record a page change at the point in time when the time 10 minutes 47 seconds has elapsed since the conference start.

The contents of the conference data index file 122 are shown in the lower left portion of FIG. 4.

As shown in the figure, the conference data index file 122 records the numbers, the times, the event descriptions, and reference destination information (for example, information indicating the number of bytes counted from the top of the real-time conference data file 124) in a format in which they are associated with each other.

To record a time separator (time chapter), the number of the time separator (time chapter) like "CP26" is entered in the column EVENT DESCRIPTION.

To record the automatic insertion chapter (ACP1, ACP2), the cause of inserting the automatic insertion chapter such as PRESENTER CHANGE or PAGE CHANGE is entered in the column EVENT DESCRIPTION.

The real-time conference data file 124 is a file in a format in which the numbers, the times, and conference data are associated with each other, as shown in the lower right portion of FIG. 4.

As the conference data index file 122 is referenced, what time the presenter change and the page change were made at can be known. As the reference destination link is followed, it is made possible to immediately access the file recording the conference description applied when the presenter change was made.

Figure 5:
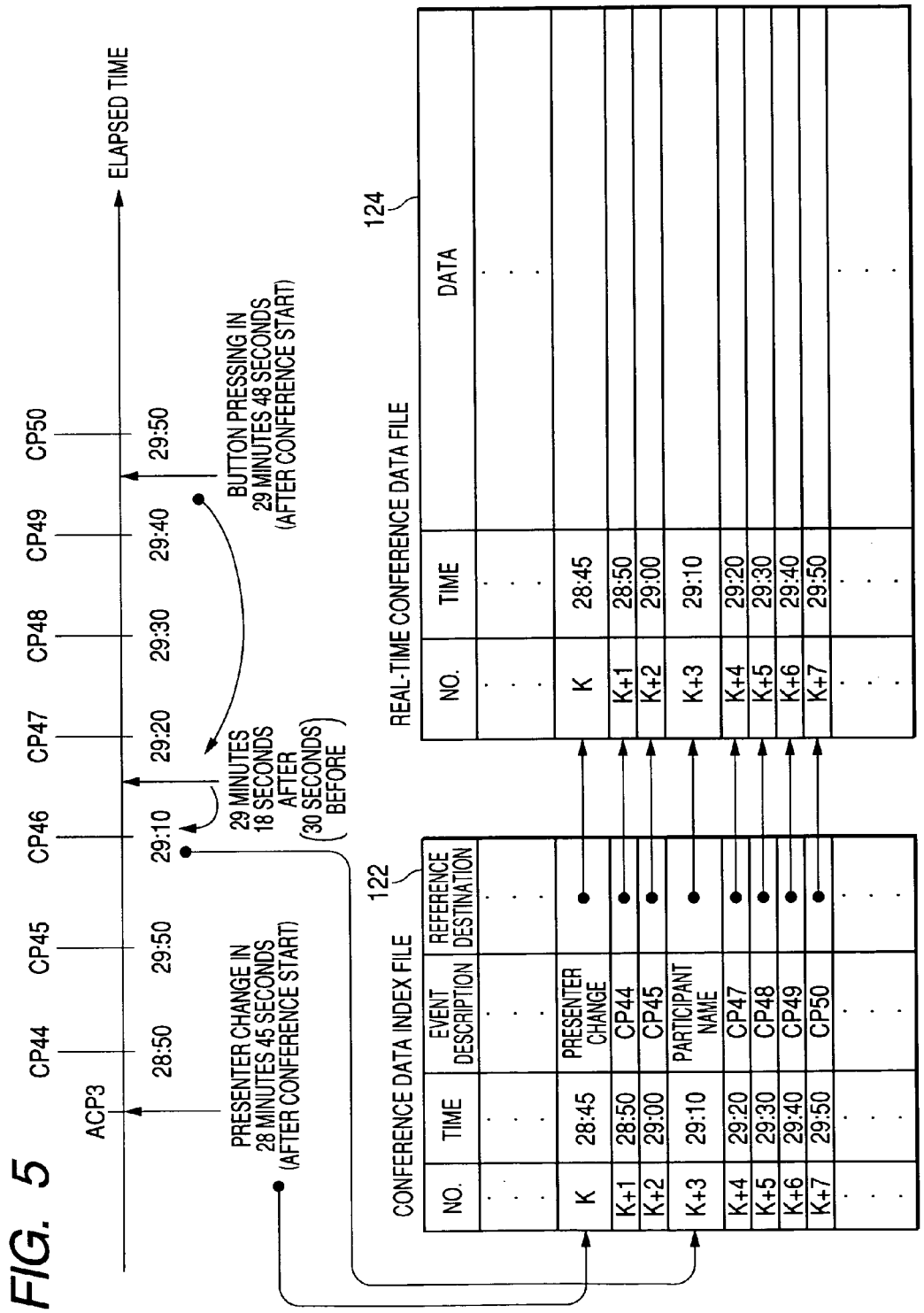
FIG. 5 is a drawing to describe the operation of recording a heading (manual insertion chapter) in the index file and the correspondence between the index file and the real-time conference data file.

FIG. 5 is a drawing to describe the operation of recording a manually inserted heading (manual insertion chapter) in the index file and the correspondence between the index file and the real-time conference data file.

Time separators (time chapters) CP44 to CP50 are set at 10-second intervals from the conference start as with the case in FIG. 4.

Presenter change occurs in 28 minutes 45 seconds after the conference start and accordingly, automatic insertion chapter ACP3 is set.

A conference participant presses the chapter insertion button (see FIG. 6) in 29 minutes 48 seconds after the conference start.

The conference server detects the participant pressing the chapter insertion button and turns back the time by 30 seconds from the button pressing time. Thus, the time is turned back by 30 seconds to 29 minutes 18 seconds after the conference start.

Next, the time separator (time chapter) CP46 just before the time is determined. The time is further turned back from 29 minutes 18 seconds after the conference start to the point in time corresponding to CP46 (29 minutes 10 seconds after the conference start). This point in time becomes the point in time at which a manually inserted heading (manual insertion chapter) is set.

Thus, the time turning-back processing is performed in the conference server, so that a manually inserted heading can be set at the appropriate point in time.

The heading (manual insertion chapter) setting time (information indicating the point in time at which the time 29 minutes 10 seconds has elapsed since the conference start), the name of the participant issuing the heading (manual insertion chapter) insertion request, and access information to the real-time conference data file 124 are recorded in the conference data index file 122 as they are associated with each other. The participant name is recorded in the column EVENT DESCRIPTION.

The real-time conference data file 124 is a file in a format in which the numbers, the times, and the conference data are associated with each other.

Among information held in the conference data index file 122, automatic insertion chapter information concerning presenter change, etc., and information of manually inserted headings (manual insertion chapters) to determine important scenes are information indicating the main points of the conference and are circulated as a list after the conference, so that a similar effect to that of circulating minutes can be provided.

That is, as a heading list (chapter list) is referenced, what time presenter change, etc., was made at and who set each heading (manual insertion chapter) at what time can be known. As the reference destination link is followed, it is made possible to immediately access the real-time conference data file 124 recording the conference description at the point in time at which each chapter was set.

Second Embodiment

Figure 6:
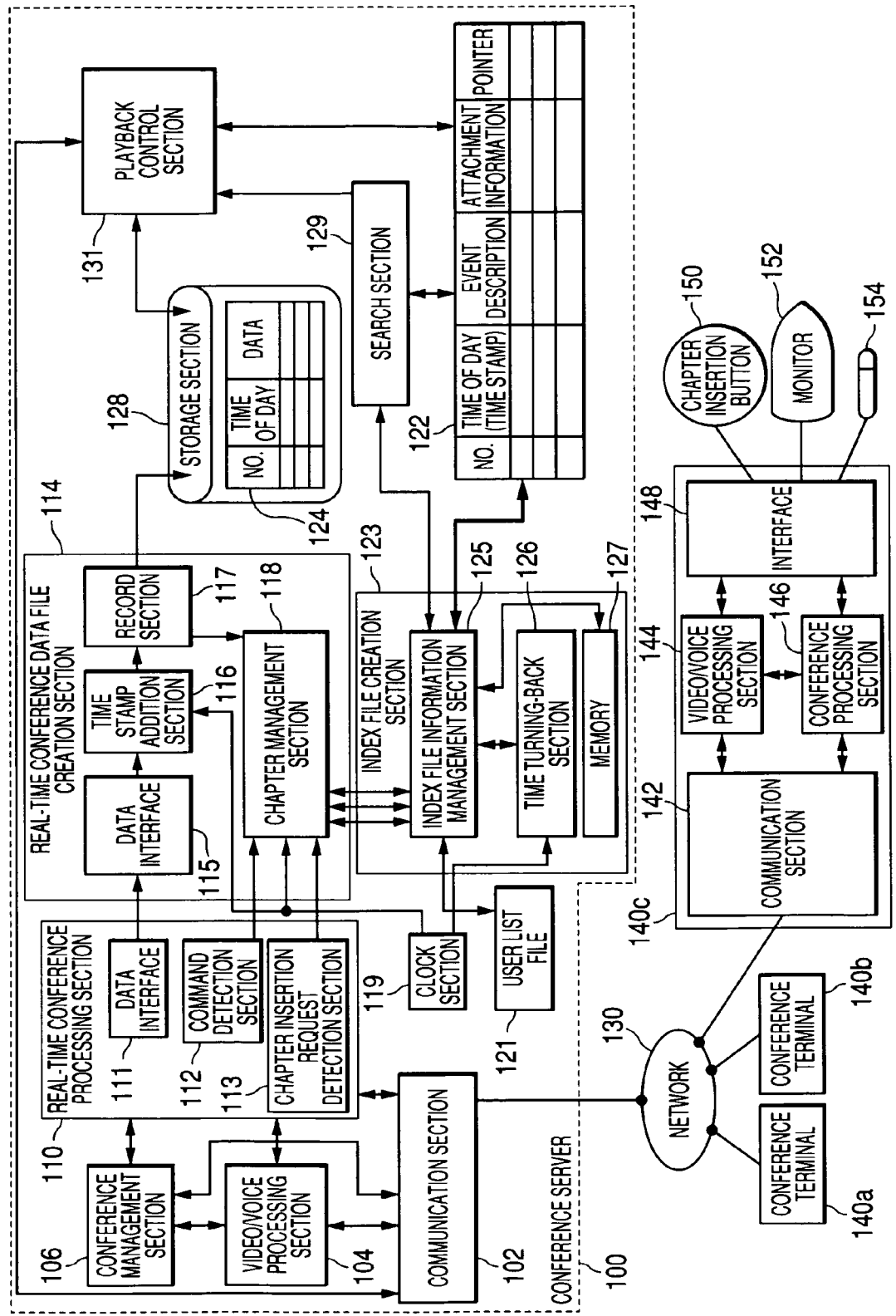
FIG. 6 is a block diagram to show the specific configuration of a network conference system (and sections making up the system) according to a second embodiment of the invention.

FIG. 6 is a block diagram to show the specific configuration of a network conference system (and components of the system) of a second embodiment of the invention. Parts identical with those previously described with reference to FIGS. 1 and 2 are denoted by the same reference numerals in FIG. 6.

A conference terminal 140c includes a communication section 142, a video/voice processing section 144, a conference processing section 146, an input/output interface 148, a chapter setting button (manually inserted heading setting means) 150, a monitor 152, and a microphone 154, as shown in the lower portion of FIG. 6.

In addition, a mouse to operate a point cursor and a camera for picking up the image of a participant are also provided although not shown in the figure. The configuration of another conference terminal (140a, 140b) is the same as that of the conference terminal 140c.

The conference terminals 140a to 140c are connected to a conference server 100 through a network 130.

The conference server 100 has a communication section 102, a video/voice processing section 104, a conference management section 106 for making a conference reservation, authenticating the participants, etc., a real-time conference processing section 110 (which has a data interface 111, a command detection section 112, and a chapter insertion request detection section 113), a real-time conference data file creation section 114 (which has a data interface 115, a time stamp addition section 116, a record section 117, and a chapter management section 118), a clock section 119, a user list file 121, a conference data index file 122, an index file creation section 123 (which has an index file information management section 125, a time turning-back section 126, and memory 127), a storage section (hard disk, etc.,) 128 for storing a real-time conference data file 124, a search section 129 for searching the conference data index file 122, and a playback control section 131 for controlling playback of the real-time conference data file 124.

The data interface 111 of the real-time conference processing section 110 transmits real-time conference data (multimedia data) to the real-time conference data file creation section 114.

The command detection section 112 detects a command for notifying presenter change, document page change, etc.

When a chapter insertion button 150 of one conference terminal (140a to 140n) is pressed and a heading (manual insertion chapter) setting request is issued, the chapter insertion request detection section 113 detects it.

The data interface 115 of the real-time conference data file creation section 114 receives real-time conference data sent from the real-time conference processing section 110, the time stamp addition section 116 adds a time stamp (time-of-day information) to the conference data, and the record section 117 records the conference data in the storage section (hard disk, etc., 128.

The chapter management section 118 of the real-time conference data file creation section 114 generates the setting timings of time separators (time chapters), automatically inserted headings (automatic insertion chapters), and manually set headings (manual insertion chapters), and instructs the index file creation section 123 to set each chapter.

The index file information management section 125 in the index file creation section 123 manages various pieces of information to be recorded in the conference data index file 122 in a unified manner and creates the index file.

The time turning-back section 126 executes "time turning-back processing" previously described. The memory 127 temporarily holds various pieces of information.

The conference data index file 122 shown in FIG. 6 is made up of numbers, times (time stamps), event descriptions, attachment information, and pointers.

The cause of conference description change such as PRESENTER CHANGE or PAGE CHANGE is entered in the column EVENT DESCRIPTION, previously described with reference to FIGS. 4 and 5.

To set a manually inserted heading (manual insertion chapter), NAME OF PARTICIPANT first issuing the heading insertion request is entered.

Information attendant on EVENT DESCRIPTION is entered in the column ATTACHMENT INFORMATION. For example, if EVENT DESCRIPTION is PRESENTER CHANGE, the name of the new presenter after the change is entered.

To set a manually inserted heading (manual insertion chapter), USER IDENTIFICATION FLAG is described.

When a plurality of heading setting requests are made for the same scene, the user identification flag is a flag for making it possible to identify all participants issuing the request.

That is, each participant is assigned one flag bit. For example, if three participants A to C exist, the number of the flag bits are three and the bit corresponding to the user issuing a request for setting a manually inserted heading (manual insertion chapter) is set to "1" and other bits are set to "0." Accordingly, who wants to set a manually inserted heading (manual insertion chapter) can be recorded easily.

POINTER is information indicating the storage address of the real-time conference data corresponding to each chapter.

That is, it is information indicating the location indicated by the number of bytes counted from the top of the real-time conference data file 124. Two pointers of video information pointer and voice information pointer are required.

After the conference is over, if a request for playing back the stored conference data is issued from one conference terminal (140a to 140n), the playback control section 131 first instructs the search section 129 to search the conference data index file 122 for chapters (automatic and manual insertion chapters) other than the time separators (time chapters), extracts the time-of-day information, the event description, and the attachment information, and creates a heading list.

The heading list is transmitted through the communication section 102 to the conference terminal (140a to 140n) issuing the conference data playback request.

The heading list is displayed on the monitor 152 of the conference terminal (140a to 140n).

If the user who wants to play back the conference data specifies a specific heading, the information corresponding to the heading is transmitted to the playback control section 131 of the conference server 100. The playback control section 131 references the pointers (links) in the conference data index file 122, reads the real-time conference data corresponding to the specified heading, and transmits the read real-time conference data to the conference terminal (140a to 140n). Accordingly, any desired conference description is reproduced on the monitor 152 of the conference terminal.

Accordingly, it is made possible to efficiently access the saved real-time conference data file 124, and the effective use of the file can be promoted.

Next, specific operation procedures of the network conference system in FIG. 6 will be discussed with reference to FIGS. 7 to 10.

Figure 7:
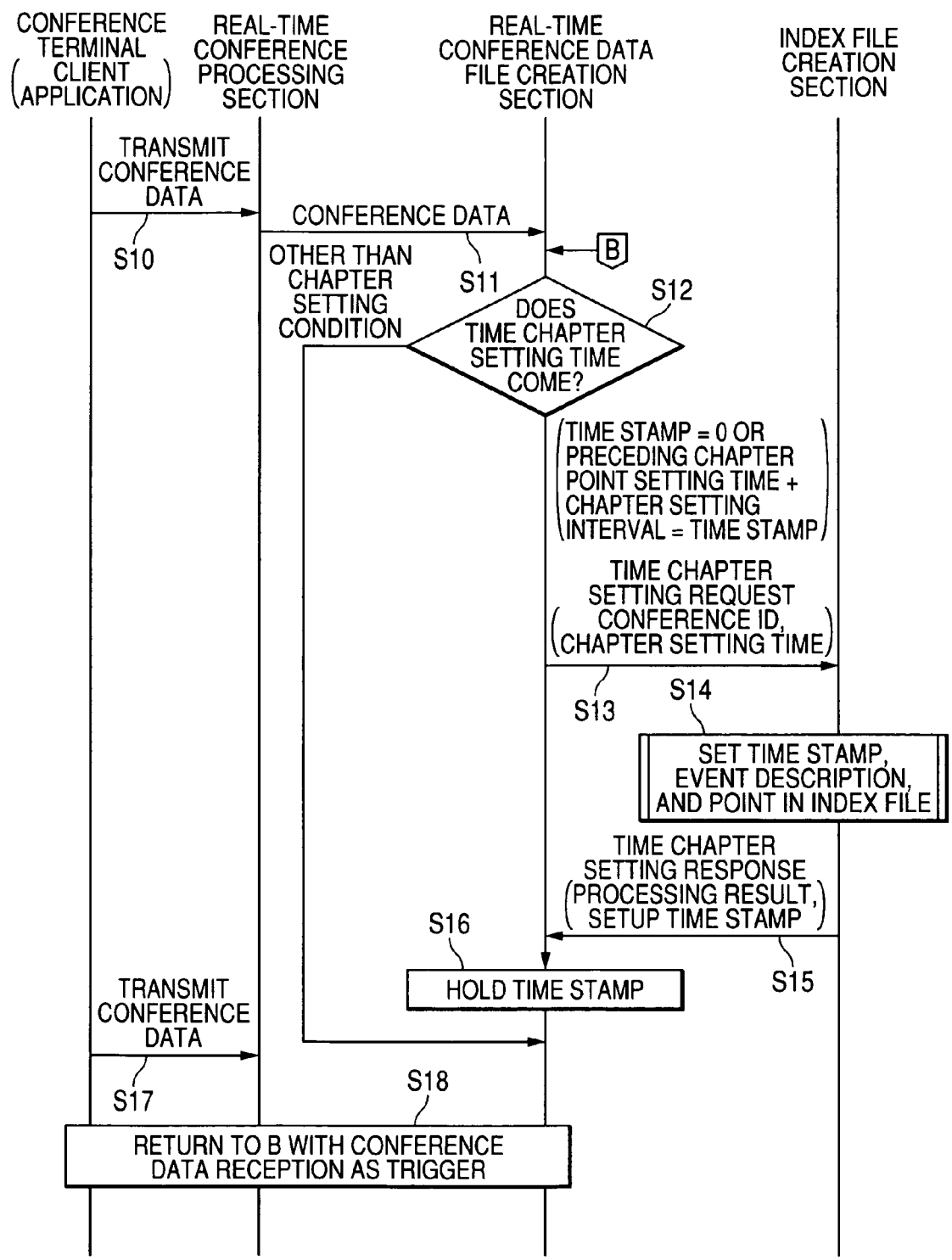
FIG. 7 is a timing chart to show a processing procedure for recording a time separator (time chapter) in the index file in the conference server of the network conference system shown in FIG. 6.

FIG. 7 is a timing chart to show a processing procedure for recording a time separator (time chapter) in the index file in the conference server of the network conference system shown in FIG. 6.

Conference data is transmitted at any time from each conference terminal (140a to 140c) (S10). The conference data is sent from the real-time conference processing section 110 to the real-time conference data file creation section 114 at any time (S11). Real-time conference data with a time stamp is stored in the storage section 128.

On the other hand, the chapter management section 118 of the real-time conference data file creation section 114 determines whether or not a time separator (time chapter) is to be recorded in the conference data index file 122 (S12).

That is, the time separator (time chapter) is set at 10-second intervals from the conference start time and thus the chapter management section 118 references the time-of-day information output from the clock section 119 and determines whether or not the time separator (time chapter) setting time comes.

When the time separator (time chapter) setting time comes, the chapter management section 118 of the real-time conference data file creation section 114 issues a time chapter setting request (S13).

The index file information management section 125 of the index file creation section 123 adds new TIME STAMP (offset value from the conference start time), EVENT DESCRIPTION, and POINTER to the conference data index file 122 to update the conference data index file 122 (S14).

The index file information management section 125 sends a time chapter setting response (containing the setting result, time stamp information indicating the setting time, etc.,) to the chapter management section 118 of the real-time conference data file creation section 114 (S15).

The chapter management section 118 of the real-time conference data file creation section 114 temporarily holds the time stamp information as the most recent time stamp information (S16).

Then, similar operation is repeated (S17 and S18).

Figure 8:
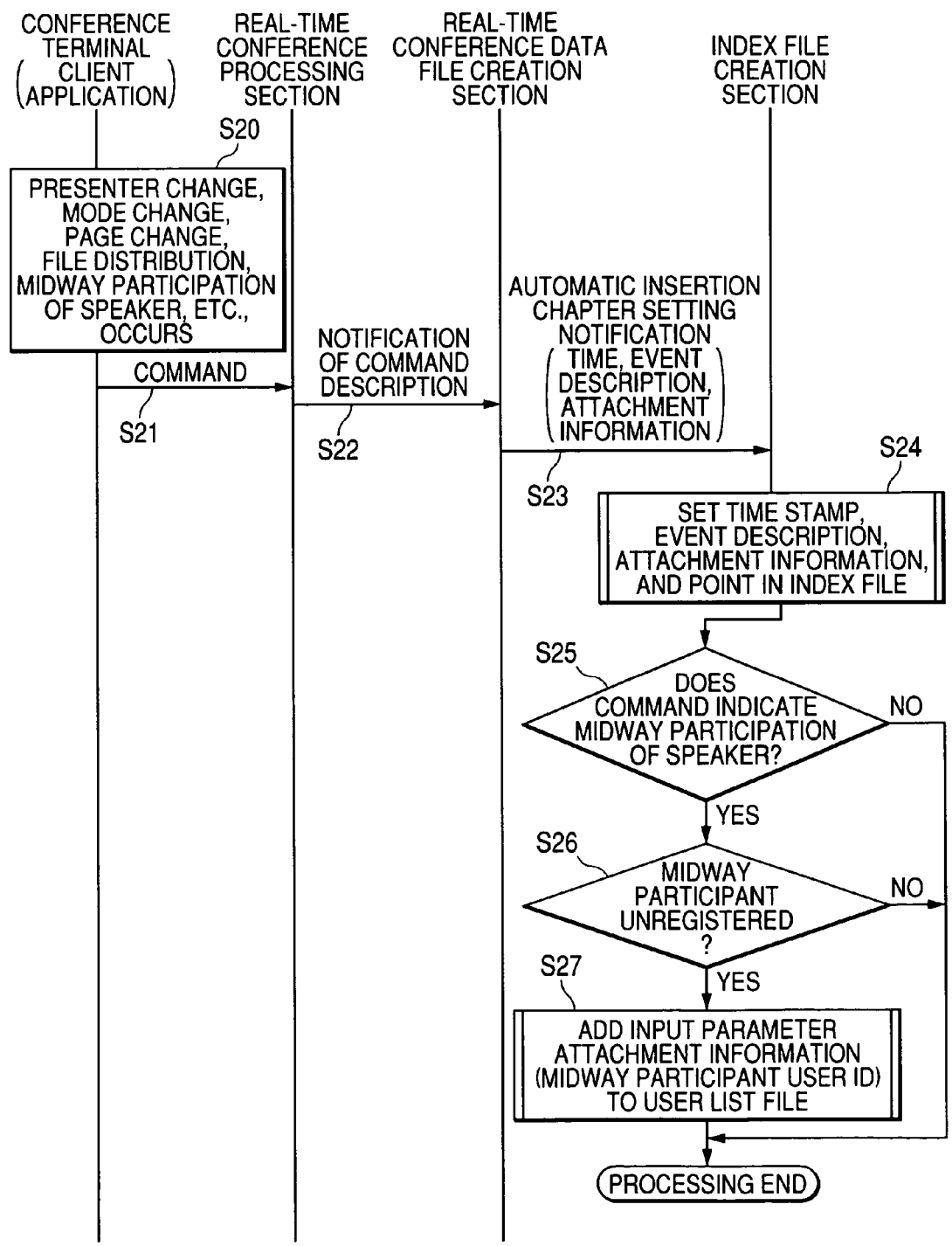
FIG. 8 is a timing chart to show a processing procedure for recording an automatically inserted heading (automatic insertion chapter) in the index file in the conference server of the network conference system shown in FIG. 6.

FIG. 8 is a timing chart to show a processing procedure for recording an automatically inserted heading (automatic insertion chapter) in the index file in the conference server of the network conference system shown in FIG. 6.

If an event such as presenter change, system mode change, page change, file distribution, or midway participation of speaker occurs (S20), a command indicating the event is sent from the conference terminal (140a to 140c) to the real-time conference processing section 110 of the conference server 100 (S21) and subsequently the description of the command is sent to the real-time conference data file creation section 114 (S22).

Next, the chapter management section 118 of the real-time conference data file creation section 114 sends a setting notification of an automatic insertion chapter (containing time stamp, event description, and attachment information) to the index file creation section 123 (S23).

The index file information management section 125 of the index file creation section 123 adds new TIME STAMP (offset value from the conference start time), EVENT DESCRIPTION, ATTACHMENT INFORMATION, and POINTER to the conference data index file 122 to update the conference data index file 122 (S24).

Next, whether or not the current command is a command indicating midway participation of speaker is checked (S25) and whether or not the midway participant is unregistered in the user list file 121 is checked (S26). If the midway participant is unregistered, the identification number (ID) of the midway participant is added to the user list file 121 (S27).

Figure 9:
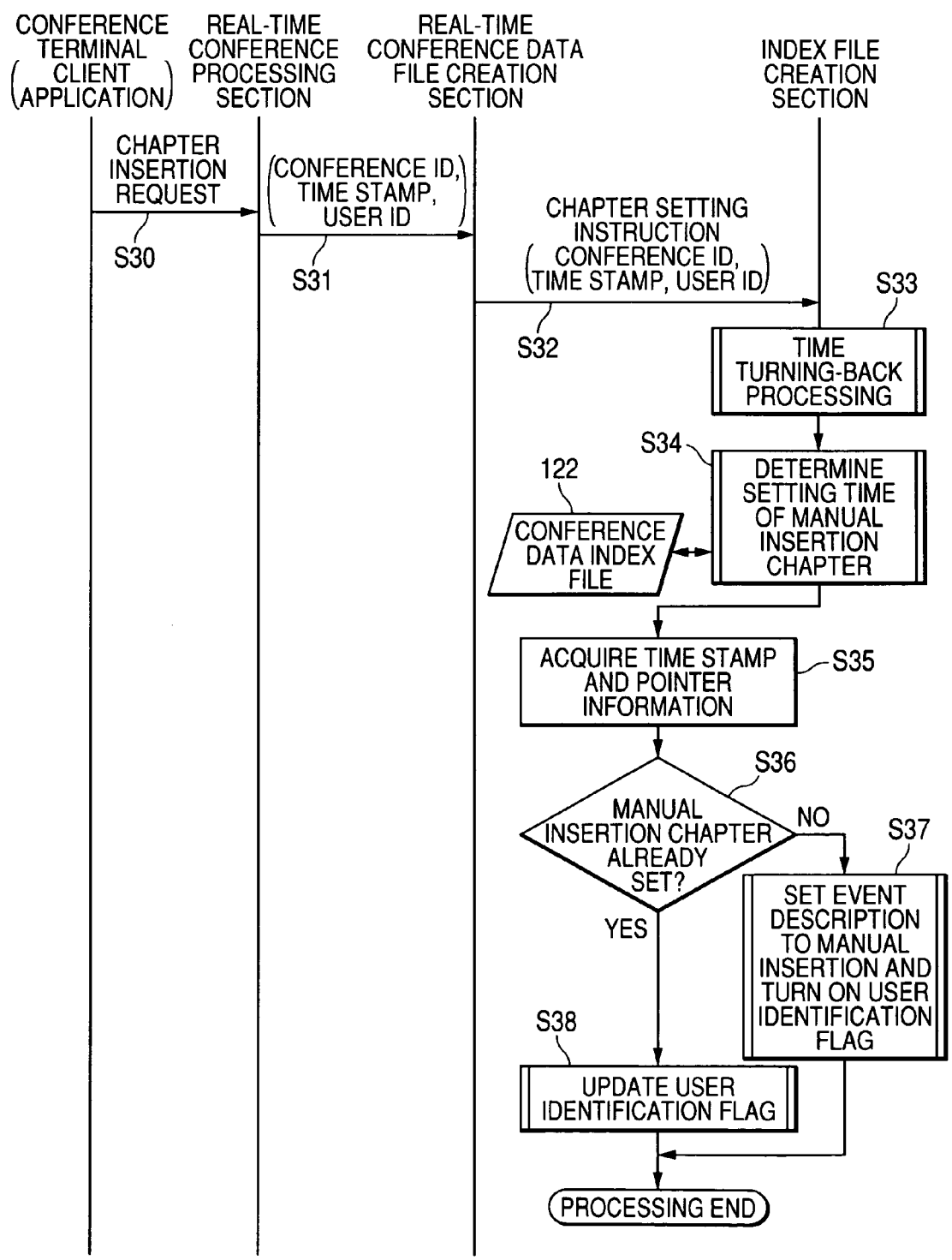
FIG. 9 is a timing chart to show a processing procedure for recording a manually inserted heading (manual insertion chapter) in the index file in the conference server of the network conference system shown in FIG. 6.

FIG. 9 is a timing chart to show a processing procedure for recording a manually inserted heading (manual insertion chapter) in the index file in the conference server of the network conference system shown in FIG. 6.

If a participant (for example, chairperson) determines that the scene is an important scene during the conference, the participant presses the chapter insertion button 150. As the chapter insertion button 150 is pressed, a request for setting a manually inserted heading (manual insertion chapter) is transmitted from the conference terminal (140a to 140c) to the conference server 100 (S30).

A notification that the request occurred is sent from the real-time conference processing section 110 to the real-time conference data file creation section 114 (S31).

The chapter management section 118 of the real-time conference data file creation section 114 instructs the index file creation section 123 to set a manually inserted heading (manual insertion chapter) (S32).

The time turning-back section 126 of the index file creation section 123 turns back the time a given time (for example, 30 seconds) on the time axis (S33), namely, performs subtraction processing of the given time from the current time-of-day information.

The index file information management section 125 determines the time separator (time chapter) immediately preceding the point in time when the time was turned back and accordingly determines the setting time of the manually inserted heading (manual insertion chapter) (S34). At this time, the index file information management section 125 references the conference data index file 122.

Subsequently, the information of the setting time of the manually inserted heading (manual insertion chapter) (time stamp and pointer) is acquired (S35).

Subsequently, whether or not another manual insertion chapter is already set at the point in time when the manually inserted heading (manual insertion chapter) is about to be set is checked (S36). The reason why the check is made is that such a situation is assumed if a plurality of participants issue a heading setting request at slightly different timings.

If another manually inserted heading (manual insertion chapter) is already set, it means that a plurality of users issue the heading insertion request.

In this case, the bit of each corresponding user, of the user identification flag recorded in the column ATTACHMENT INFORMATION of the conference data index file 122 is changed from "0" to "1" (accordingly, information as to who the heading setting requester is, is added), and the conference data index file 122 is overwritten for update (S38).

If the check result at S36 is NO, EVENT DESCRIPTION in the conference data index file 122 is set to MANUAL INSERTION and to identify the user issuing the heading setting request, the identification flag bit of the user is changed from "0" to "1" (S37).

The conference data index file 122 is thus updated (S38).

The configuration, the operation, and the procedures for updating the index file at any time have been described, but the invention is not limited to the embodiments described above and various modifications of the invention can be made.

For example, the conference client application may be a dedicated application or may be an application operating on a WEB browser.

The real-time conference data file may be a single file or may be made up of division files. However, as the file is divided into a plurality of files, it is made possible to read and write one file easily and rapidly.

The portion for storing the real-time conference data may exist in a different server from the conference server. In this case, however, it becomes necessary to transfer control information between the conference server and the different server.

As for the format of the index file, recording the time-of-day information (time stamp) may be suppressed to decrease the data amount, or information supplementary to the event description may be added for making it possible to access the real-time conference data file more precisely.

A technique of giving the identification number proper to the conference to the index file for management may be adopted.

For the conference participant to set a manually inserted heading (manual insertion chapter), the turn-back amount to turn back the time on the time axis can also be adjusted in response to the time during which the chapter insertion button is pressed, the number of times the chapter insertion button has been pressed per unit time, etc. In this case, the ease-of-use of the system is furthermore improved.

Next, an operation procedure for playing back the saved real-time conference data will be discussed.

Figure 10:
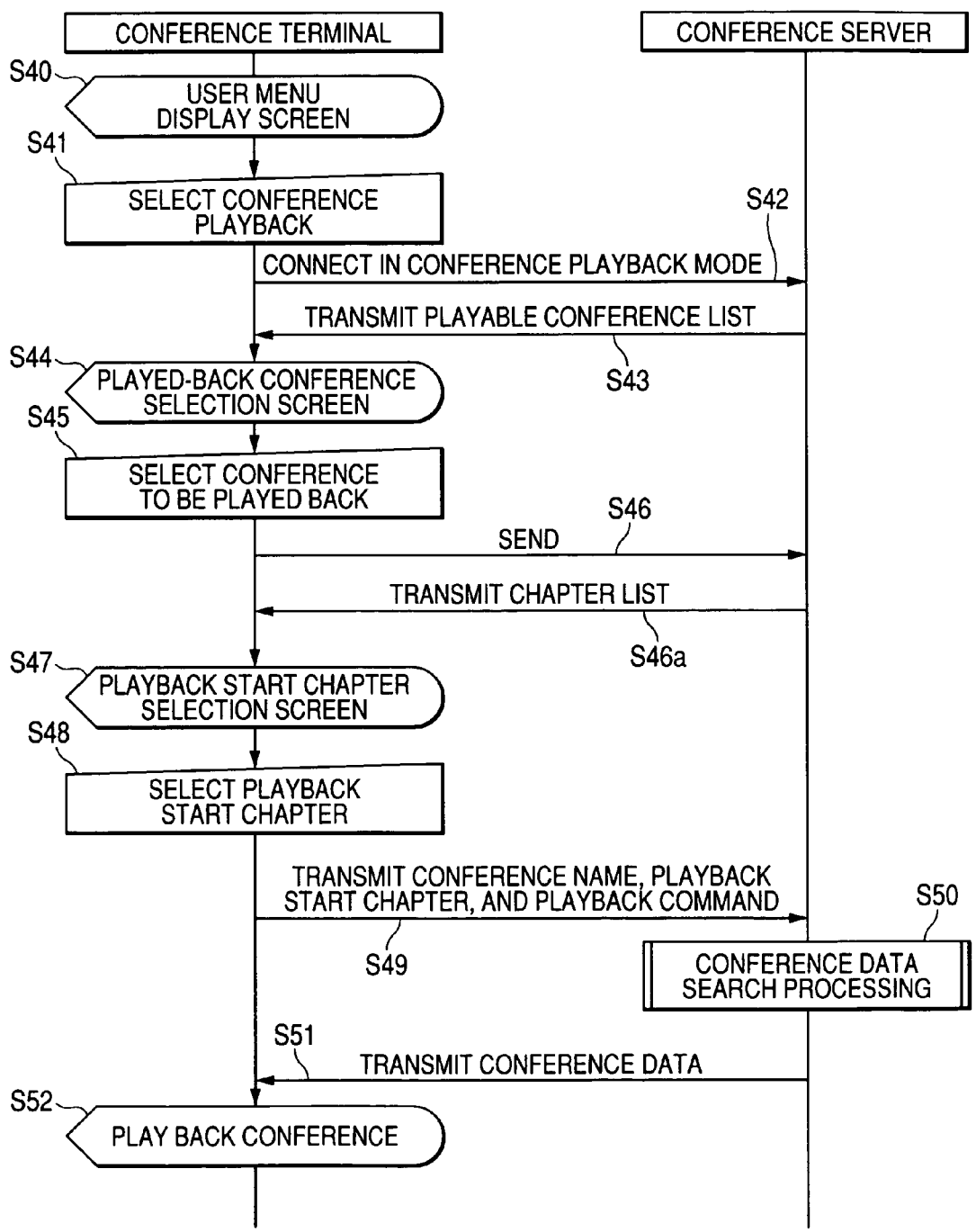
FIG. 10 is a flowchart to show an operation procedure for playing back the saved real-time conference data file on a conference terminal in the network conference system in FIG. 6.

FIG. 10 is a flowchart to show the operation procedure for playing back the saved real-time conference data file on the conference terminal in the network conference system in FIG. 6.

The user of one conference terminal (140a to 140c) displays a menu on the monitor 152 (see FIG. 6) (S40) and selects CONFERENCE PLAYBACK (S41).

The conference terminal is connected to the conference server 100 in a conference playback mode (S42).

The playback control section 131 of the conference server 100 first transmits a playable conference list to the conference terminal (S43).

The conference list is displayed on the monitor 152 on the conference terminal (S44) and when the user selects the conference to be played back (S45), identification information of the selected conference is sent to the conference server 100 (S46).

Upon reception of the identification information, the playback control section 131 of the conference server 100 instructs the search section 129 to search the conference data index file 122 for necessary heading information (namely, information of automatically inserted headings (automatic insertion chapters) and manually inserted headings (manual insertion chapters) except time chapters) creates a list of the found information, and transmits a list of the headings to the conference terminal (S46a).

The heading list is displayed on the monitor 152 (S47) and the user selects one heading out of the heading list (S48).

Then, the conference name, the heading (chapter) to be played back, and a playback command are transmitted from the conference terminal to the conference server 100 (S49).

The playback control section 131 of the conference server 100 references the pointer (link information) in the conference data index file 122, searches the real-time conference data file 124 saved in the storage section 128, and reads the corresponding part of the real-time conference data (S50).

Next, the read real-time conference data is transmitted to the conference terminal (S51).

The real-time conference data is played back on the conference terminal (S52).

Thus, the index file is used, whereby it is made possible to easily access the saved real-time conference data file and the effective use of the conference data is promoted.

The index file is updated at any time during the progress of the conference and a list of the headings extracted from the index file serves as minutes, so that saving in the time and labor for creating the minutes can be accomplished.

The configuration and the operation to play back the real-time conference data are not limited to those in the embodiment and various modifications can be made.

For example, in FIG. 10, first a conference list is transmitted and next a heading list is transmitted, but the lists may be transmitted at the same time.

A heading list may be created by extracting only the headings relevant to a specific event or only the headings set by a specific participant.

If a plurality of participants want to set a heading (chapter) for the same scene, it is considered that the importance of the scene is high. Therefore, only the headings satisfying the condition that the number of users wanting to set a heading exceeds a predetermined threshold value may be extracted to create a heading list.

As for the real-time conference data transmission technique from the conference server to the conference terminal, a technique of executing burst transmission of data in the real-time conference data from the conference server and playing back the conference on the conference client as the time stamps may be adopted.

It can also be made possible to again display the heading list on the conference terminal during playback of the real-time conference data and specify a new conference playback start point. In doing so, only the parts that the users want to see (the parts of the headings that the users want to see) can be played back one after another on the conference terminal, and efficient playback is realized.

As described above, the network conference system in the embodiment is a server-client network conference system including the conference server 100 having the real-time conference data file 124 containing real-time conference data placed on the time series and the conference data index file 122 used to search the real-time conference data file 124 and having time-of-day information, heading information, and information to access the real-time conference data file 124 as they are associated with each other; and the conference terminals 140a to 140n each as a client connected to the conference server 100 through the network 130, wherein after a real-time conference is over, the real-time conference data file 124 is accessed based on the heading information in the conference data index file 122 and any desired real-time conference data can be read and played back on the conference terminal 140a to 140n, wherein each of the conference terminals 140a to 140n includes a manual input unit for the user to manually enter a heading insertion request, and wherein if a participant of the real-time conference enters a heading insertion request through the manual input unit of the conference terminal 140a to 140n while the real-time conference proceeds, the conference server 100 determines the time turned back from the point in time at which the heading insertion request was entered, sets a manually inserted heading at the determined point in time, and records information of the setup heading in the conference data index file 122.

According to the network conference system, when a conference participant holds a feeling that one point is important during the conference, if the participant issues a heading insertion request, a heading can be set at the appropriate point in time. That is, it is made possible to set a manually inserted heading (manual insertion chapter). Accordingly, it is made possible to easily access the saved real-time conference data file without creating minutes.

After the conference is over, immediately a heading list can be distributed. Seeing the heading list, the number of important parts (important scenes) and the time at which each of the scenes occurred (or the elapsed time since the conference start) can be known immediately.

It is made possible for the conference participant to instantly access an important scene of the conference after the conference and play back the scene. Since saving in the time and labor for searching can be accomplished, efficient circulation is made possible.

A user who does not take part in the conference can keep track of the conference description in a short time by using the circulation and playback functions of the invention.

Therefore, the ease-of-use and the convenience of the network conference system are improved.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A server-client network conference system comprising:
a conference server having
a real-time conference data file containing real-time conference data placed on time series and
an index file used to search the real-time conference data file and having time-of-day information, heading information, and information to access the real-time conference data file as they are associated with each other; and
a conference terminal as a client connected to the conference server through a network,
wherein, after a real-time conference is over, the real-time conference data file is accessed based on the heading information in the index file and any desired real-time conference data can be read and played back on the conference terminal,
wherein the conference terminal includes a manual input unit for a user to manually enter a heading insertion request, and
wherein the conference server is configured such that, if a participant of the real-time conference enters the heading insertion request during the real-time conference, the conference server:
determines a time which precedes a point in time at which the heading insertion request is entered,
sets a manually inserted heading at the determined time, and
records information of the setup heading in the index file.

2. The network conference system as claimed in claim 1, wherein the conference server sets time separators at predetermined time intervals from the start time of the real-time conference on a time axis, and
wherein when the heading insert ion request is entered through the manual input unit, the conference server turns back the time by a predetermined time from the entry time on the time axis, determines the time separator set just before the turned-back time, and sets the manually inserted heading at the time corresponding to the determined time separator.

3. The network conference system as claimed in claim 2, wherein the conference server changes the length of the predetermined time by which the time is turned back from the heading insertion request entry time in response to information entered through the manual input unit.

4. The network conference system as claimed in claim 1, wherein, when the user transmits a playback request from the conference terminal to the conference sever after the real-time conference is over, the conference server sends a list of the heading information in the index file to the conference terminal of the user,
wherein, when the user references the heading information list on the conference terminal and specifies any desired heading, the conference terminal sends the specification information to the conference server, and
wherein the conference server reads the real-time conference data file on and after the set time of the specified heading and sends the read file to the conference terminal to play back the real-time conference data file on the conference terminal.

5. A conference terminal having the manual input unit for a user to manually enter a heading insert ion request for use with the network conference system as claimed in claim 1.

6. A conference server having creation and management functions of the real-time conference data file and the index file for use with the network conference system as claimed in claim 1.

7. A conference server having a search function of the index file, a transmission function of the heading information list in the index file, and a transmission function of the real-time conference data file on and after the time corresponding to the specified heading for use with the network conference system as claimed in claim 4.

* * * * *